United States Patent [19]
Pechacek

[11] 3,830,605
[45] Aug. 20, 1974

[54] VULCANIZING DEVICE

[75] Inventor: Raymond E. Pechacek, Houston, Tex.

[73] Assignee: Hahn & Clay, Houston, Tex.

[22] Filed: Apr. 12, 1973

[21] Appl. No.: 350,617

[52] U.S. Cl.................. 425/28 R, 425/40, 425/47
[51] Int. Cl............................ B29h 5/02, B29h 5/08
[58] Field of Search............. 425/17, 20, 21, 22, 23, 425/24, 25, 28, 31, 32, 33, 34, 35, 36, 40

[56] References Cited
UNITED STATES PATENTS

| | | | |
|---|---|---|---|
| 1,388,255 | 8/1921 | Hardeman | 425/35 |
| 1,811,567 | 6/1931 | Shook | 425/40 |
| 2,279,540 | 4/1942 | Voth et al. | 425/36 |
| 2,424,915 | 7/1947 | Bosomworth et al. | 425/40 |
| 3,067,457 | 12/1962 | Dennis et al. | 425/17 X |
| 3,154,814 | 11/1964 | Fike | 425/25 |
| 3,465,385 | 9/1969 | Zangl | 425/36 |
| 3,602,948 | 7/1971 | Lejeune | 425/28 R |
| 3,669,581 | 6/1972 | Mauer | 425/40 X |
| 3,701,615 | 10/1972 | Johnson | 425/23 |
| 3,770,858 | 11/1973 | Ireland et al. | 425/21 X |

*Primary Examiner*—J. Howard Flint, Jr.
*Attorney, Agent, or Firm*—Pravel, Wilson & Matthews

[57] ABSTRACT

A self-contained vulcanizing device including a vulcanizing vessel having mounted therein a fixed upper platen and a movable lower platen to receive a mold therebetween, the lower platen being movable to a clamped position by a piston mounted within the vessel and powered by fluid under pressure.

13 Claims, 4 Drawing Figures

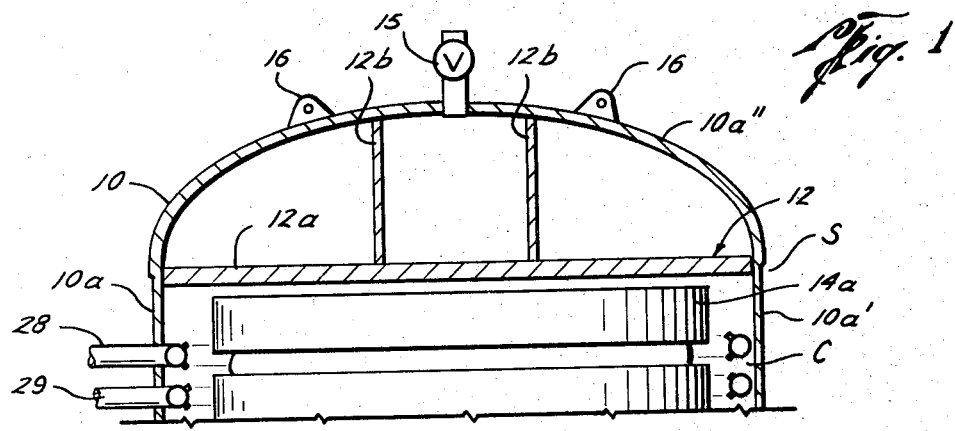
Fig. 1
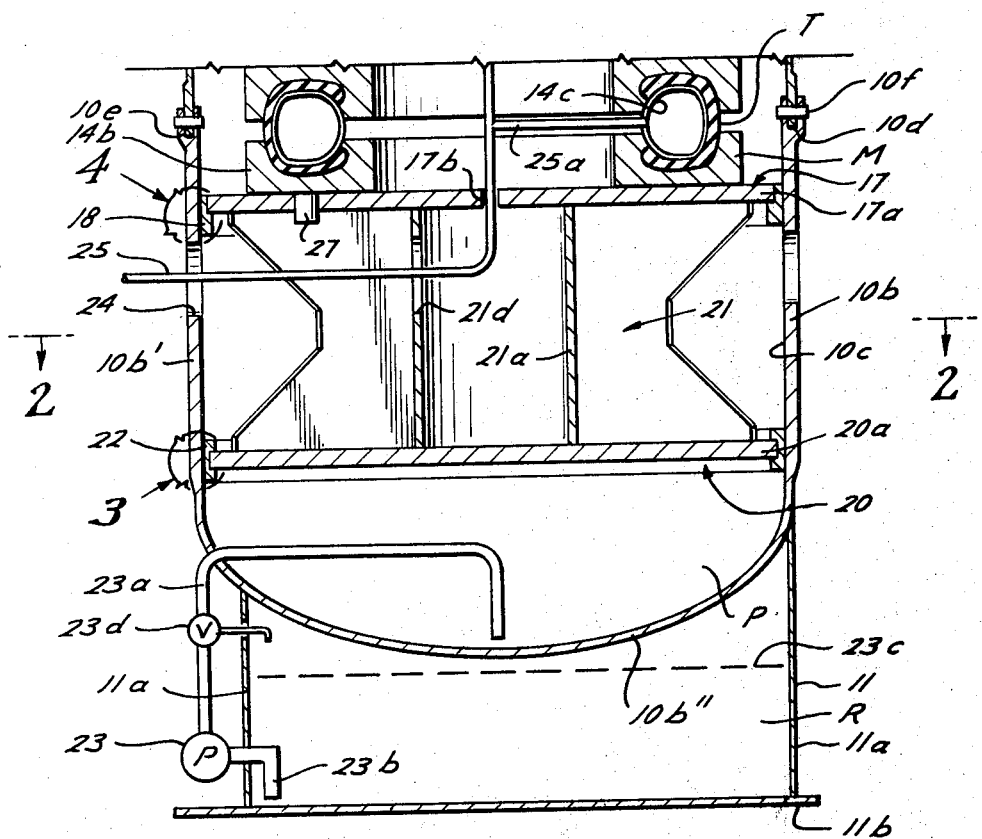

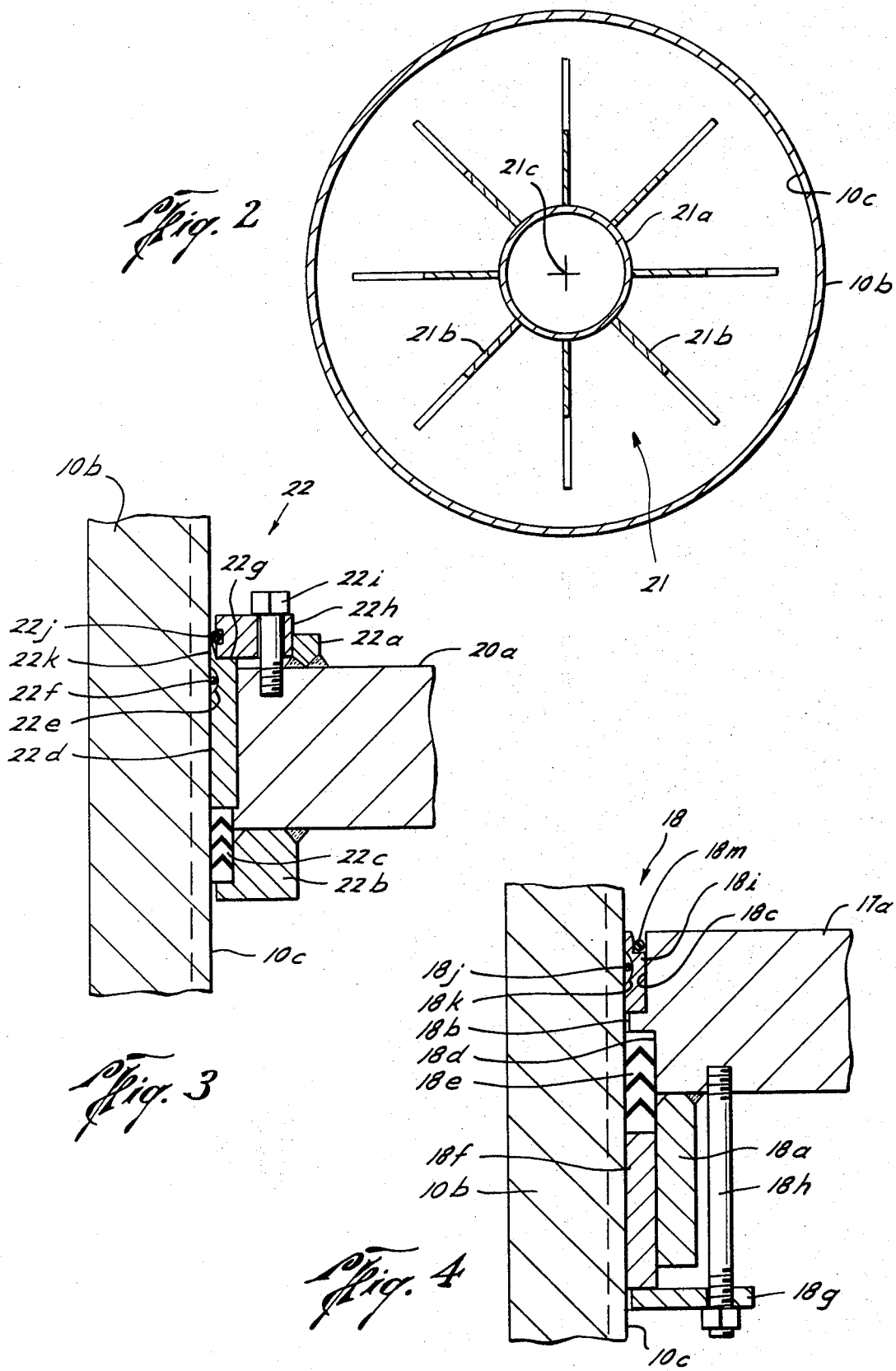

VULCANIZING DEVICE

BACKGROUND OF THE INVENTION

The field of this invention is vulcanizing devices for rubber products such as tires.

Vulcanizers for producing tires and other articles present very special design problems. A vulcanizing chamber must be provided in which the product is vulcanized by the application of heat. If the product being vulcanized is in a mold, such as a tire mold, the mold will tend to expand and separate during vulcanization. In order for the product to have the proper shape, powerful resistive forces must be exerted against the mold to maintain the mold plates locked together during vulcanization.

Various types of vulcanizers have been produced. For example, U.S. Pat. Nos. 1,487,036; 1,811,567; and 3,602,948 disclose vulcanizers that are relatively compact as compared with some of the more elaborate vulcanizers such as those disclosed in U.S. Pat. Nos. 1,980,203 and 2,587,119.

SUMMARY OF THE INVENTION

It is an object of this invention to provide a new and improved self-containing vulcanizing apparatus that is extremely compact and yet is capable of resisting the mold expansion forces occurring during vulcanization of rubber or other vulcanizable products. The vulcanizing apparatus of the preferred embodiment of this invention includes first and second platen means mounted in a vulcanizing vessel, the second platen means being mounted for slidable, sealable movement with respect to the first platen means such that vulcanizing molds can be received and supported therebetween. The first and second platen means cooperate to provide a vulcanizing chamber for curing such vulcanizable products as rubber. Piston means are mounted within the vessel in operable connection with the second platen means for moving the second platen means into clamped engagement against the molds for maintaining the molds locked together even during the actual vulcanizing process. The piston is slidably, sealably mounted within the vessel and is positioned by means of hydraulic fluid under pressure provided by a pump means mounted at the base of the vessel.

The second platen means includes a platen member slidably, sealably mounted for slidable movement with respect to the inside walls of the vessel; and, the piston means includes a piston member, slidably, sealably mounted for movement with respect to the inside walls of the vessel. The second platen member and the piston member are spaced or separated from each other and connected to each other by a plurality of support braces.

The configuration of both the lower platen member and the piston member is basically circular in cross-section and the diameters of the members are approximately equal to each other and only slightly less than the inside diameter of the vessel itself. In this manner, the piston member and the lower platen member may be held in position against the expansion forces that occur in the molds during vulcanizing by means of hydraulic fluid under substantially lower pressure than heretofore utilized.

BRIEF DESCRIPTION OF THE DRAWINGS

FIG. 1 is a sectional view in elevation of the vulcanizing apparatus of the preferred embodiment of this invention;

FIG. 2 is a sectional view taken along line 2—2 of FIG. 1 illustrating the construction of the support bracing which connectes the lower platen member and the piston member;

FIG. 3 is an exploded view of the piston peripheral seal means; and

FIG. 4 is an exploded view of the lower platen seal means.

DESCRIPTION OF THE PREFERRED EMBODIMENT

Referring to the drawings, the letter S generally designates the self-contained vulcanizer apparatus of the preferred embodiment of this invention for vulcanizing rubber or other vulcanizable materials in one or more molds M. The vulcanizing apparatus S includes a vessel generally designated as 10 which includes an upper portion 10a removably mounted onto a lower vessel portion 10b. The lower vessel portion 10b is supported on a base generally designated as 11 which includes upstanding support walls such as 11a mounted with a base bottom 11b which is adapted for placement on any flat surface that can support the weight of the entire apparatus S. The upper and lower vessel portions 10a and 10b can be made of any suitable material such as steel. Further, the inside wall 10c of the lower vessel portion 10b is made of polished stainless steel or some other extremely smooth and suitable surface. The lower vessel portion 10b includes a cylindrical portion 10b' and a semi-spherical bottom portion 10b'' welded or otherwise attached thereto in a well known manner. The inside, polished vessel wall 10c thus has a circular configuration of a certain diameter.

Similarly, the upper vessel portion 10a includes a cylindrical portion 10a' and a semi-spherical portion 10a''. The upper vessel portion 10a is removably mounted onto the lower vessel portion 10b by any suitable means. In the embodiment illustrated in FIG. 1, the end 10d of the upper vessel portion is seated in a circular recess 10e in the lower vessel portion and a plurality of pins 10f are used to secure the upper vessel portion in a mounted position on the lower vessel portion. It is noted that the connection between the upper vessel portion 10a and the lower vessel portion 10b is both a removable connection and a sealed connection.

An upper platen means generally designated as 12 includes an upper platen member 12a mounted by welding or other suitable means within the upper vessel portion 10a. The upper platen or plate member 12a is welded or otherwise attached with the upper vessel portion 10a and is supported in such position by vertical ribs 12b which are welded to the platen member 12a and to the inside of the semi-spherical top 10a''. The upper platen member 12a is adapted to receive and engage upper plate 14a of a mold M. The upper platen member 12a has one or more openings (not shown) therethrough in order to control the pressure within the vulcanizing chamber C, which will further be defined hereinafter. A pressure relief valve 15 is mounted in the semi-spherical vessel top 10a'' in order to relieve undesirably high pressures within the vulcanizing chamber C.

Lugs 16 are welded or otherwise attached onto the vessel top 10a'' in order to facilitate removal and replacement of the upper vessel portion 10a.

A second or lower platen means generally designated as 17 includes a lower plate or platen member 17a that is mounted for slidable, sealed movement with respect to the inside wall 10c of the lower vessel portion 10b. The lower, movable platen member 17a cooperates with the upper, fixed platen member 12a in the upper and lower vessel portions 10a and 10b, respectively, to produce a sealed vulcanizing chamber C. The platen member 17a is actually a flat plate having a circular configuration with a diameter only slightly less than the diameter of the inside vessel wall 10c. A peripheral seal means generally designated as 18 is mounted onto the platen member 17a and extends into sealed engagement with the inside vessel wall 10c in order to mount the lower platen member 17a for slidable, sealed movement with respect to the inside, lower vessel portion wall 10c. The lower platen peripheral seal means 18 is illustrated in exploded view FIG. 4, which will be described in further detail hereinafter.

A free-floating piston means generally designated as 20 includes a flat, piston-plate member 20a that is mounted within the lower vessel portion 10a in slidable, sealed engagement with respect to inside vessel wall 10c. The piston-plate member 20a is mounted below the lower platen member 17a and is operably connected therewith by support brace means generally designated as 21. The support means 21 supports the lower platen member 17a in a spaced relationship, separated from the piston-plate member 20a. A piston peripheral seal means generally designated as 22 and illustrated in the exploded view FIG. 3 is mounted onto the piston-plate member 20a for sealable, slidable engagement with the inside vessel wall 10c.

The support means 21 includes a central, tubular support member 21a welded or otherwise attached to the lower platen member 17a and the piston-plate member 20a at the center of both members. A plurality of radial braces 21b are mounted onto the outside wall of the tubular member 21a and extend radially outwardly therefrom (with respect to the center 21c of the vessel portion 10b). The tubular base member 21a and the radial braces 21b extending therefrom function to separate the lower plate member 17a from the piston-plate member 20a and further to evenly distribute forces exerted on the lower platen member 17a between the lower platen member 17a and the piston-plate member 21a.

The sealing of the piston-plate member 20a by means of the peripheral seal 22 provides a power chamber P within the lower vessel portion 10b for receiving hydraulic fluid such as oil or other suitable fluid under pressure in order to displace the piston-plate member 20a and the lower platen member 17a. Hydraulic fluid under pressure is applied within the power chamber P by pump 23 having line 23a extending through vessel bottom 10b'' into the power chamber P. The pump 23 is connected by line 23b to a reservoir which is designated by the letter R and is formed by the upstanding base walls 11a and the base bottom 11b. For the purposes of illustration, the dotted line 23c illustrates the level of fluid therein. A control valve 23d is mounted in the line 23a which extends into the power chamber P. Operation of the pump 23 causes introduction or removal of hydraulic fluid under pressure into the power chamber P thus controlling the position of the piston-plate member 20a and the lower platen member 17a within the lower vessel portion 10b.

The lower vessel portion 10b includes openings 24 to atmosphere circumferentially spaced about the cylindrical wall portion 10b' at a height where the openings are always positioned between the lower platen member 17a and the piston-plate member 20a. In this manner, an air space is always present between the lower platen member 17a and the piston-plate member 20a, the air space serving to at least partially insulate the power chamber P and the hydraulic fluid therein from the heat of the vulcanizing chamber C.

An L-shaped tubing 25 is mounted in one of the openings 24 and extends through an opening 21d in the tubular support 21a and upwardly through an opening 17b in the center of the lower platen member 17a. The tubing 25 extends into one or more molds M and terminates in an internal, expansible mold member 14c. In this manner, water or other fluid can be delivered from outside the vessel into the molds M in order to support the material, such as a tire T in its proper shape in a well known manner.

A drain plug 27 is provided for easily removing water or other fluid from the vulcanizing chamber C whenever desired. A steam spray ring 28 extends through upper cylindrical vessel wall 10a' and circumferentially about the molds such as M whereby steam may be delivered quite uniformly to the molds in order to precipitate the vulcanizing process. Further, a water spray ring 29 having the same configuration and mounting as the steam spray ring 28 is also mounted within the vulcanizing chamber C in order to cool the molds M after the vulcanizing process has occurred.

The piston peripheral seal means 22 illustrated in detail in FIG. 3 includes an annular ledge 22a welded onto the top thereof and another annular ledge 22b welded onto the bottom of the piston-plate 20a. An annular chevron packing 22c is mounted on the retainer ring or ledge 22b in position to actually engage the polished inside vessel wall surface 10c. An annular wiper 22d, which may be made of Teflon, bronze brass or other suitable mateiral is mounted above the chevron packing 22c for engaging the inside vessel wall 10c. The wiper 22d includes a circular groove 22e on the outside thereof and a retainer spring 22f is mounted in the groove in order to retain the wiper 22d in position against the piston-plate member 20a. The wiper 22d includes a flat upper surface portion 22g and an upper lip 22k. A packing gland or retainer ring 22h is positioned between the annular ledge 22a and the outside, upper wiper lip 22k and is maintained in the position by a plurality of bolts 22i. The bolts 22i serve a further purpose of causing the retainer ring 22h to compress the wiper and chevron packing to enhance the seal between the inside vessel wall 10c and the piston-plate member 20a. An annular seal ring 22j of suitably resilient material is mounted in an outside groove in the retainer ring 22h such that the seal ring 22j cooperates with the wiper 22d and the chevron packing 22c to sealably, slidably mount the piston-plate member 20a for movement along the inside vessel wall 10c.

The platen peripheral seal means generally designated as 18 is illustrated in detail in FIG. 4. The peripheral seal means 18 for the platen member 17a includes a retaining ledge 18a welded or otherwise attached to the underside of the lower platen member 17a. A circumferential lip portion 18b provides an upper circumferential recess 18c and a lower circumferential recess 18d. A chevron packing 18e is mounted in the lower circumferential recess in position to engage the polished vessel wall 10c. A bearing 18f of Teflon (polytetrafluoroethylene) or other suitable material is mounted below the chevron packing 18e and is held in position by a retainer ring 18g which is mounted by means of bolts such as 18h. The retainer ring 18g causes compression of the bearing 18f and the chevron packing 18e in order to slidable, sealably mount the lower platen member 17a. Further, a wiper 18i is mounted in the upper circumferential recess 18c and extends into engagement with the polished vessel wall 10c. A string retainer 18j is positioned in a circular groove 18k in the wiper in order to retain the wiper in position. Finally, a seal ring 18m is positioned in an upper, inside groove or recess in the wiper 18i in order to provide a seal between the wiper and the upper recess portion 18c of the platen member 17a. In this manner, the platen member 17a is mounted for slidable, sealed movement along the polished vessel wall 10c thereby providing a sealed, upper vulcanizing chamber C for the vulcanization of rubber or other vulcanizable products in molds M.

In the operation and use of the vulcanizing apparatus S of the preferred embodiment of this invention, the lower platen member 17a is moved to a lower position such as illustrated in FIG. 1 by pumping hydraulic fluid out of the power chamber P. The upper vessel portion 10a is then removed after removal of pins 10f and one or more molds M are placed on top of the lower platen member 17a. The mold M may be a tire mold or a mold for other materials which can be vulcanized. In the embodiment shown herein, the mold M is a tire mold containing rubber material T for producing a tire. After the tire mold M has been placed on top of the lower platen member 17a, the upper vessel portion 10a is then replaced on top of the lower vessel portion 10b and the pins 10f are inserted such that the vessels are locked together in sealed engagement thereby providing the vulcanizing chamber C. Then, the hydraulic pump 23 is activated to pump hydraulic fluid under pressure into the power chamber P thereby moving the piston-plate member 20a and the lower platen member 17a upwardly to a clamped position.

Thus, if only one mold M is being placed in the vulcanizing chamber C, the upper mold plate 14a is positioned in contact with the fixed upper platen 12a and lower mold plate 14b is held in position against the upper plate member 14a by the lower platen member 17a in the clamped position. Water or other fluid is then introduced through the tube 25 to inflate the internal portion of the molds in a well known manner. Steam is then applied through the steam ring 28 thereby increasing the temperature in the vulcanizing chamber C until vulcanization occurs. As is well known in the art, during vulcanization, the tendency towards expansion exerted by the vulcanizing material T on the mold plates 14a and 14b exerts great stresses upon the platen members 12a and 17a. Of course, the upper and lower mold plates 14a and 14b must be held in a locked position in order to properly shape the tire T. It is the function of the piston-plate member 20a to cooperate with the lower platen member 17a through the bracing members 21a and 21b to support and maintain the mold plates 14a and 14b in the locked position, in spite of the high pressures exerted internally by the material T being vulcanized.

It is noted that the diameter of the piston-plate member 20a is substantially equal to the inside diameter of the lower vessel portion 10b. This provides a large surface area for the hydraulic fluid to act against within the power chamber P. This rather large surface area allows the piston-plate member 20a to be held in position against the expansion stresses exerted from within the mold M at comparatively low hydraulic pressures as compared with many of the previous types of vulcanizing units.

The piston-plate member 20a is as large as it can possibly be and still be mounted within the vessel portion 10b so that a very compact vulcanizing unit S is provided. It is further noted that the diameter of the lower platen member 17a is almost exactly equal to that of the piston-plate member 20a, which provides for more even distribution of the vulcanizing stresses between the lower platen member 17a and the piston-plate member 20a. The radial bracing serves to distribute these stresses more evenly and the very large peripheral seal means 18 and 22 further serve to reduce any localized stress on the seal so that the life of the seal is increased.

The radial bracing 21b and the central tubular brace 21a further serve to separate the lower platen member 17a from the fluid within the power chamber P so that the fluid within the power chamber P is not subjected to damaging heat which emanates through openings 24. Further, the separation of the piston-plate member 20a from the lower platen member 17a serves to reduce the effects of the heat from the vulcanizing chamber C on the piston peripheral seal means 22 thereby increasing further the life of that particular seal.

After the vulcanization process is completed, the flow of steam through the steam ring 28 is shut-off and cooling water is provided through the spray ring 29.

After the heating cycle has been completed and the vulcanizing chamber C has been cooled down by the water spray, the water within the vulcanizing chamber C may be drained by removal of the drain plug 14f. The upper vessel portion 10a can then be removed and the entire cycle repeated with new molds containing products such as tires to be vulcanized.

The foregoing disclosure and description of the invention are illustrative and explanatory thereof, and various changes in the size, shape, and materials as well as in the details of the illustrated construction may be made without departing from the spirit of the invention.

I claim:

1. A self-contained vulcanizing device for the production of vulcanized material, comprising:
   a vulcanizing vessel;
   first platen means mounted in said vessel for receiving one side of a mold for molding vulcanizable products;
   second platen means mounted in said vessel for receiving the other side of said mold;
   platen mounting means mounting said second platen means in slidable, sealed engagement with respect to the inside walls of said vessel, said second platen means being movable to a clamped position wherein said first and second platen means cooperate to provide a sealed vulcanizing chamber;

piston means positioned in said vessel and operatively connected to said second platen means for moving said second platen means to said clamped position;

piston mount means mounting said piston means for slidable, sealed movement within said vessel; and power means connected with said piston means for moving said piston to an operative position in which said second platen means is in said clamped position.

2. The structure set forth in claim 1, wherein said second platen means includes:

a platen member having a configuration substantially conforming to the inside wall of said vessel; and said platen mounting means including a platen peripheral seal means attached to said platen member and extending into slidable, sealed engagement with the inside wall of said vessel.

3. The structure set forth in claim 1, wherein said piston means includes:

a piston member having a configuration conforming to the inside wall of said vessel.

4. The structure set forth in claim 3, including:

piston peripheral seal means mounted with said piston member and extending into slidable, sealed engagement with the inside wall of said vessel.

5. The structure set forth in claim 1, wherein:

said piston means and said vessel cooperate to form a sealed power chamber, said piston means being movable by the introduction of fluid under pressure into said sealed power chamber.

6. The structure set forth in claim 5, wherein said power means includes:

pump means for pumping fluid under pressure into said power chamber.

7. The structure set forth in claim 2, wherein said piston means includes:

a piston member having a configuration substantially conforming to the inside wall of said vessel; and piston peripheral seal means mounted with said piston member and extending into slidable, sealed engagement with the inside wall of said vessel.

8. The structure set forth in claim 7, wherein:

said platen member is longitudinally spaced from said piston member.

9. The structure set forth in claim 7, including:

radial braces connecting said piston member to said second platen member.

10. The structure set forth in claim 1, including:

support means supporting said second platen means and said piston means in a longitudinally spaced relationship; and said vessel having an opening to atmosphere therein between said second platen means and said piston means.

11. The structure set forth in claim 3, including:

said vessel being circular in cross-section; and said piston member having a diameter slightly less than the diameter of the inside wall of said vessel housing.

12. The structure set forth in claim 11, including:

said second platen means including a platen member having a diameter substantially equal to the diameter of said piston member.

13. The structure set forth in claim 1, including:

means for introducing a heating medium into said vulcanizing chamber.

* * * * *